Oct. 23, 1962 CHUNG SHU KWEI 3,059,554
PHOTO-COMPOSING MACHINE
Filed Feb. 12, 1960 7 Sheets-Sheet 3

INVENTOR.
CHUNG SHU KWEI
BY
Davis, Hoxie, Faithfull & Hapgood
ATTORNEYS.

Oct. 23, 1962 CHUNG SHU KWEI 3,059,554
PHOTO-COMPOSING MACHINE
Filed Feb. 12, 1960 7 Sheets-Sheet 4

INVENTOR.
CHUNG SHU KWEI
BY
Davis, Hoxie, Faithfull & Hapgood
ATTORNEYS.

Oct. 23, 1962 CHUNG SHU KWEI 3,059,554
PHOTO-COMPOSING MACHINE
Filed Feb. 12, 1960 7 Sheets-Sheet 5

INVENTOR.
CHUNG SHU KWEI
BY
Davis, Hoxie, Faithfull & Hapgood
ATTORNEYS.

Oct. 23, 1962   CHUNG SHU KWEI   3,059,554
PHOTO-COMPOSING MACHINE
Filed Feb. 12, 1960   7 Sheets-Sheet 6

INVENTOR.
CHUNG SHU KWEI
BY
Davis, Hoxie, Faithfull & Hapgood
ATTORNEYS.

United States Patent Office 3,059,554
Patented Oct. 23, 1962

3,059,554
PHOTO-COMPOSING MACHINE
Chung Shu Kwei, 600 West End Ave., New York, N.Y.
Filed Feb. 12, 1960, Ser. No. 8,321
14 Claims. (Cl. 95—4.5)

This invention relates to apparatus for use in photographically composing characters to be printed. My present invention is an improvement of the apparatus disclosed in my U.S. Patent 2,820,404, issued January 21, 1958.

In my above-identified patent, there is disclosed a photoprinting apparatus comprising a hollow drum mounted for rotary and axial movement. A portion of the periphery of the drum is formed by a transparent negative having superimposed arcuate rows of the characters to be projected for photographing. A stationary light source is mounted at one side of the drum periphery and a stationary exposure station at the other side, so that any of the characters can be photographed at the exposure station by adjusting the drum rotationally and axially so as to position a selected character in the line of projection between the light source and the exposure station. To facilitate adjustment of the drum by the operator, the drum is provided at one portion of its periphery with arcuate rows of characters to be photographed, and at another portion of its periphery a table of characters corresponding to the negative characters and arranged in arcuate rows similar to those on the negative. A stationary index is mounted adjacent the drum periphery and coacts with the table of characters to indicate thereon the character corresponding to the negative character positioned for the projecting operation. Preferably, the table characters are displaced angularly about the drum axis from the corresponding negative characters, the index member having a similar angular displacement from the line of projection between the light source and the exposure station, whereby the index can be used by the operator for selectively positioning the drum without interference from the photographic device formed by the exposure station and light source. An apparatus of this type has the advantage of simplicity, will accommodate a large number of characters, and can be quickly and easily adjusted for projecting the characters in the desired sequence.

The present invention has particular reference to an apparatus of this type having improved means for facilitating the selective positioning of the drum by the operator to project the characters in the desired sequence, and for assuring that each selected character on the negative will be accurately positioned between the light source and the exposure station.

In the preferred construction, the drum mount includes a vertical member or shaft on which the drum is movable axially and rotatably, and a biasing element is connected to the drum for urging it upward on the vertical shaft so as to counteract the weight of the drum. In this way, the biasing element permits axial adjustment of the drum on the vertical shaft but retains the drum in any axial position to which it is raised or lowered. The biasing element preferably comprises a counterweight connected to the drum and disposed on its lower portion, where it is supported by vertical posts or legs extending through the open bottom end of the drum, and the drum is supported on the vertical shaft by means of a hub, or the like, through which the shaft extends and which is connected to the drum periphery at the top of the drum. With this structure, the drum may be conveniently arranged with the table of characters on one sector of the drum, and the transparent negative at another sector of the drum in order that the operator selection station be angularly displaced from the photographic station.

A feature of the invention resides in means for facilitating accurate positioning of a selected negative character on the drum prior to the projecting operation. According to this feature, each character on the transparent negative has associated therewith an L-shaped reticle symbol for use as a reference for locating the horizontal and vertical centerline of the character selected for photographing.

In the following specification I will describe three forms of my invention which utilize this reticle symbol to achieve accurate alignment of the negative characters in the optical field of the exposure station. The first two forms utilize visual and manual techniques for achieving this alignment and the third form includes an electronic system for accomplishing alignment automatically.

In the first embodiment there is, adjacent to the drum, a stationary transparent window having a corresponding L-shaped reticle symbol imposed on a piece of transparent film. The latter reticle is stationary in the optical path of the camera and is positioned to geometrically define the horizontal and vertical centerlines of the field of view of the camera, in the same relation as the former symbol bears to the negative character, so that when the two symbols are registered one upon the other, the center of the character necessarily is in the center of the field of view. The fixed reticle symbol disposed to be biased against the surface of the transparent negative to minimize optical parallex. By imparting a color to the stationary reticle it is possible to have visible means of registration. By selecting a particular color for the fixed symbol, to which the film is insensitive, the illuminated reticle symbol will not be recorded on the film as the transparent character is photographed. Positioning a system of lenses and mirrors at one side of the photographic axis enables the operator to rapidly visually select the proper character and provide optical registration of the character with a minimum of effort. This method of registration, I have found is more reliable than the mechanical registration system disclosed in my above referenced patent.

A second method of achieving similar results may be accomplished by the use of a dichroic mirror. It is well known that a dichroic mirror has the property of reflecting light of a specific color to which it is adjusted, with negligible attenuation, and will transmit, through it, all other colors practically unattenuated.

If the negative character reticle symbol itself is ascribed a particular color, say red, a red adjusted dichroic mirror may be angularly disposed directly in the optical path to reflect the projected image of the symbol through a projection lens onto a viewing screen positioned near the operator's site. With such an arrangement, the fixed colored reticle symbol may be dispensed with and replaced by a fixed reticle symbol on the viewing screen. In this embodiment the red component of the character image itself, since white light is composed of equal quantities of the primary colors, red, blue and green, would also be reflected by the dichroic mirror onto the viewing screen. The red component of the character image having thus been subtracted from the image beam, the image falling upon the camera will have only blue and green components which appear as a cyan colored image.

A third modification results in a method of obtaining automatic electronic centering of any selected character. By ascribing each of the primary colors of red, blue and green to the various components of the negative image, color separation of each of the components is possible by using multiple dichroic mirrors. Separate vertical and horizontal servo motor drive systems are provided ing large numbers of characters in a font. With such an arrangement two character negative tables each occupying a 90° sector may be alternately arranged with two corresponding character tables. This latter arrangement represents the maximum number of characters which can be accommodated with this system without interchanging character tables.

Figure 8:
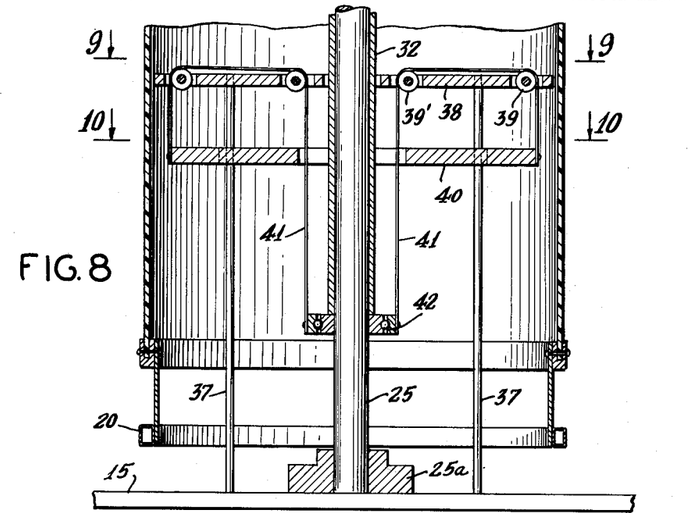
Figures 9, 10:
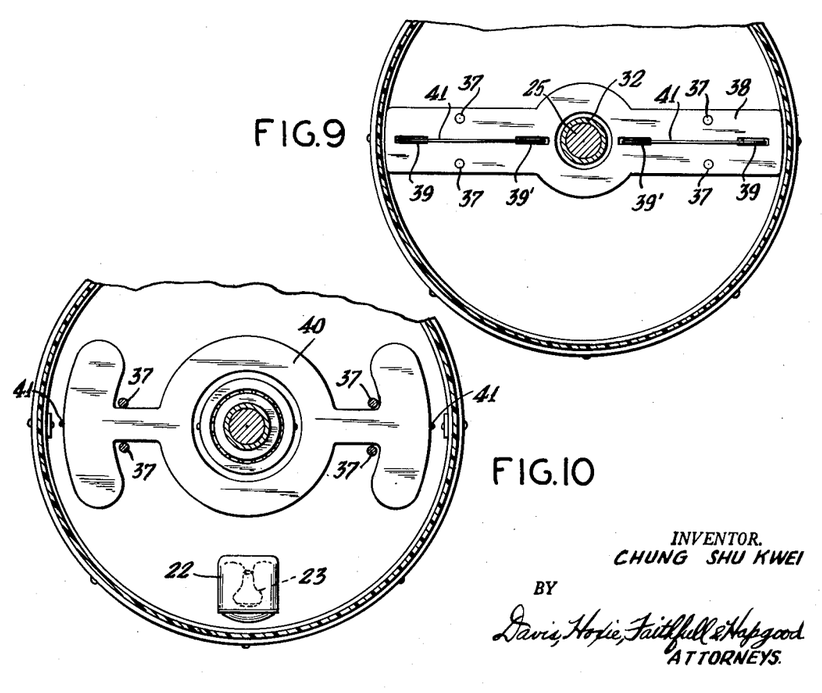

Secured to the base 15 are four vertical posts 37 which extend upward through the open bottom of the drum and support at their upper ends a cross bar 38, as shown in FIGS. 8–10. The cross bar 38 has pulleys 39 mounted in recesses in the cross bar, the pulleys being arranged at diametrically opposite sides of the vertical shaft 25 which extends through the cross bar. Below the cross bar 38 is a biasing element in the form of a counterweight 40 having a central opening through which the shaft 25 and sleeve 32 extend. The counterweight 40 is secured at opposite ends to wires 41 extending upwardly over the outer pulleys 39, then radially inward and over the inner pulleys 39', and then downward through the cross bar 38 and counterweight 40 to the outer race of a ball bearing assembly 42. The inner race of the bearing 42 has a close sliding fit around the vertical shaft 25 and supports the lower end of sleeve 32. With this arrangement, the drum 16 may be rotated on the vertical shaft 25 without affecting the counterweight 40, and the latter will hold the drum 16 in any vertical position to which it is adjusted by sliding the sleeve 32 up or down on shaft 25. In other words, the counterweight 40 operates through the wires 41 and bearing 42 to urge the drum upward so as to counteract the weight of the drum. Thus, the drum can be easily adjusted both rotationally and axially, as by grasping the hand rail 20 secured to the bottom portion of the drum periphery and turning the drum or raising or lowering it.

Figure 11:
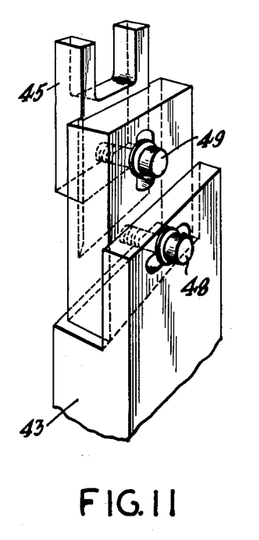

In the first form of the invention, there is secured to the base 15, between the drum 16 and the camera 17, a vertical post 43 pivoted at its base 44 for movement toward or away from the drum. Secured to the top of the post is a reticle frame 45 to support a stationary reticle film 46 (FIG. 5) to be described in detail below. The frame is tilted at a slight forward angle with respect to the post and is adjustable laterally and vertically by the set screws 48 and 49, as shown in FIG. 11 to obtain precise optical alignment of the reticle in the field of camera vision. The post 43 is urged toward the drum 16 by means of the spring 50 attached between the post 43 and the base 15. In operation, the reticle 46 is urged gently against the surface of the negative 35 to minimize optical parallax between the reticle and the character negative.

Figures 3, 4:
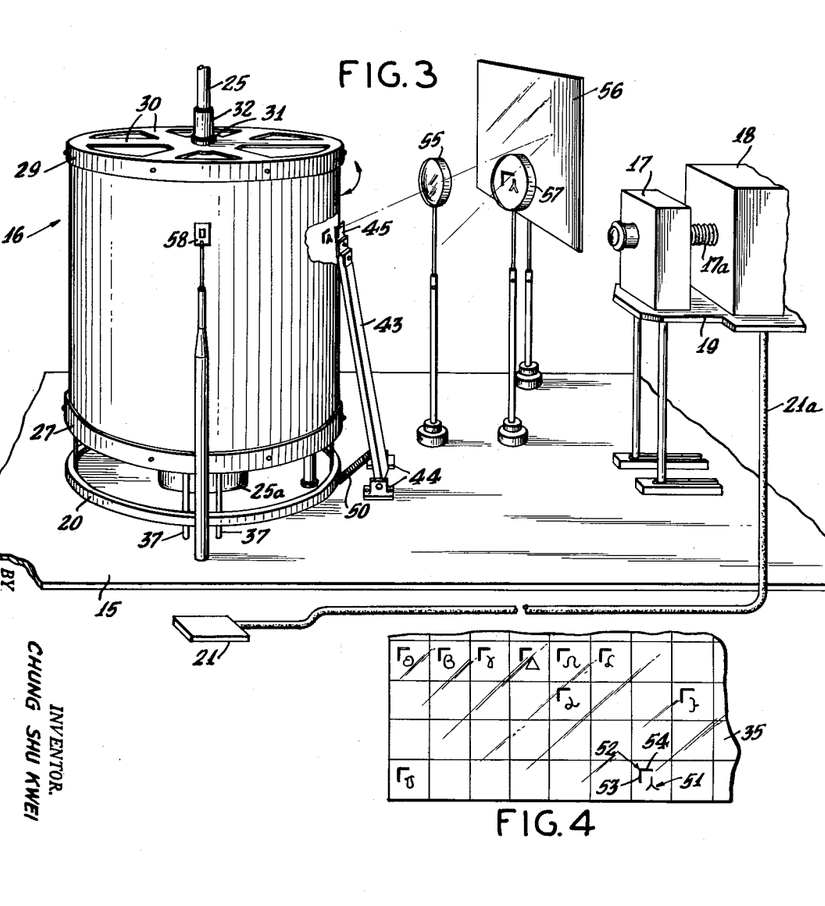

FIG. 4 shows an enlarged view of a section of the negative character table 35, and in particular a character 51 which is desired to be photographed. Associated with each character in the upper left-hand corner of the field is a symbol 52 in the form of an inverted L. The vertical leg 53 of the symbol 52 is displaced from the vertical centerline of the character by an arbitrarily chosen dimension which remains constant for all characters utilized in the system. Similarly, the horizontal leg 54 of the symbol 52 is displaced from the horizontal centerline of the character by the same chosen dimension. When it is desired to align any selected character for photographing it is only necessary to align the symbol of that particular character with the identically-shaped reference reticle 47 (FIG. 5) on the film 46 disposed in the frame 45 to align the geometric center of the image in the path of the optical axis of the camera 17. This prevents the character from being displaced horizontally or vertically from its desired position.

The stationary reticle symbol 47, if black in color, when properly aligned with the character symbol would blot out or mask the light projecting through the character symbol and prevent its registration on the film during exposure. However, I prefer to color the stationary reticle symbol and select a color to which the camera film is nonresponsive. For example, it is known that certain film is insensitive to red light and thus a red stationary reticle symbol permits rapid visual alignment without danger of photographing the symbol. In this arrangement I prefer that the silver surface of the character negative be on the outside of the drum and that the colored stationary reticle symbol 47 be arranged on the rear surface of the stationary reticle plate or film 46 to minimize optical parallax which results when the two surfaces are separated by the thickness of the film.

Figure 5:
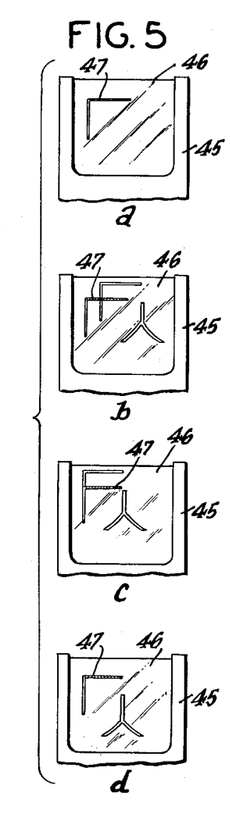
Figure 6:
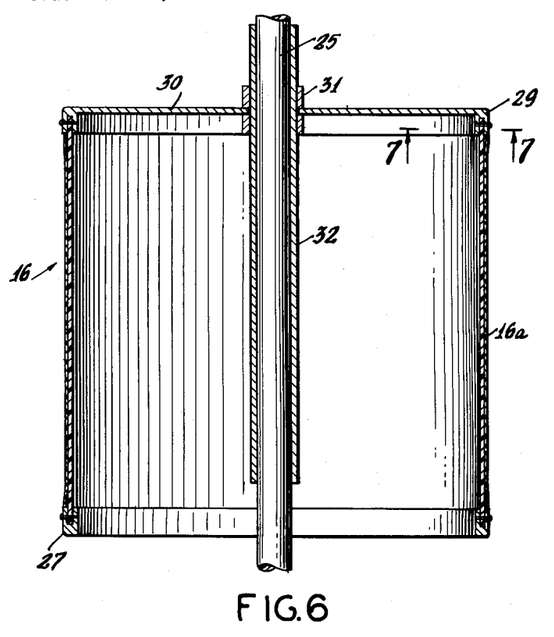
Figure 7:
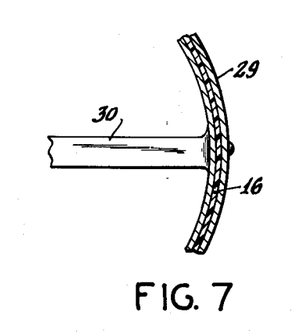

FIG. 5 illustrates the optical relationships of the character reticle symbol 52 and the fixed reticle symbol 47 during various stages of the optical alignment procedure. FIG. 5a illustrates the red fixed reticle symbol 47 on film 46 disposed on the frame 45. FIGS. 5b, 5c and 5d respectively, illustrate various drum settings indicating that the drum is too high and off to one side, drum too high but horizontally aligned and lastly where the drum 16 is correctly positioned both horizontally and vertically. Thus, as shown in FIG. 5d, when optical alignment of the negative character and the fixed reticle symbol is achieved, the view exposed to the camera will be a red illuminated reticle and a white illuminated character on a black background. When the photograph is taken, only the character will appear on the film, and it will be optically aligned in the geometric center of the image field.

Figure 1:
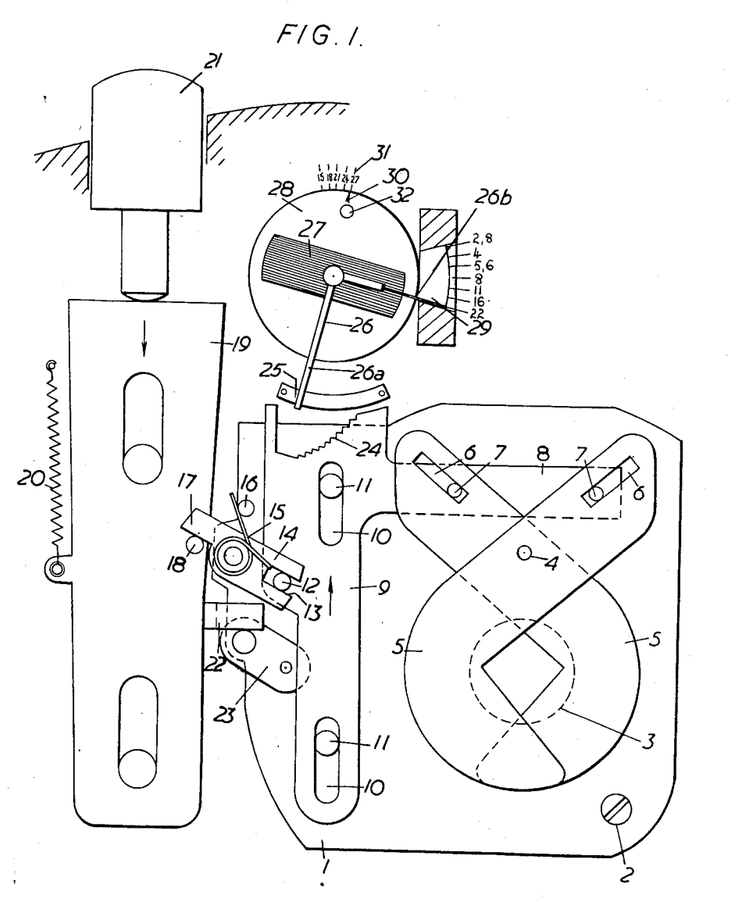

Since the table of characters is displaced from the photographic station by 90° it would be inconvenient for the operator to move back and forth from station to station to select the desired character and then achieve optical alignment. To overcome this difficulty, as shown in FIGS. 1, 2 and 3, I have arranged on the base 15 an optical system consisting of a first lens 55 to project the character image onto a mirror 56 and a second magnifying lens 57 positioned between the operator's line of sight 58a and the mirror image. With this arrangement, the operator, after selecting the proper character by aligning it in the fixed view finder 58, need only move his eyes into alignment with the magnifying lens to see in the mirror an enlarged image of the character and the stationary reticle while simultaneously adjusting the height and the angle of the drum to achieve perfect alignment. The exposure is then made in the normal manner by depressing the button 21.

Figure 12:
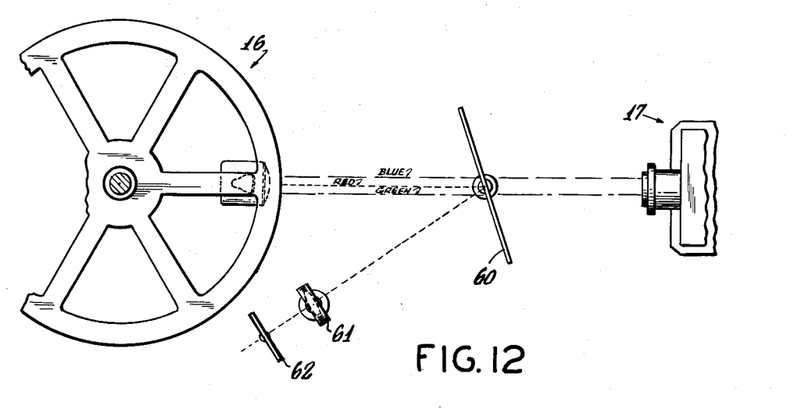
Figure 12A:
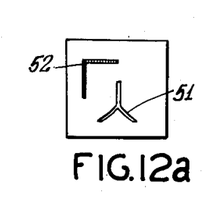
Figure 12B:
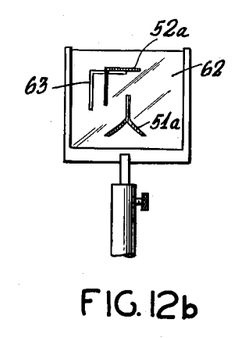

The second form of my invention, previously outlined, is herein described with reference to FIGS. 12, 12a and 12b. FIG. 12 illustrates, in plan, the arrangement of components which eliminate the necessity for the fixed reticle 46 and its associated support members 43—50, and the optical system 55—57. In the optical path a red dichroic mirror 60 is angularly disposed to intercept the image of the reticle symbol and to reflect it through the projection lens 61 onto the ground glass viewing screen 62. FIG. 12a illustrates the form of modification of a particular negative character where the symbol 52 is now colored red. This coloring may be done by an artist using colored ink or other suitable coloring matter. FIG. 12b illustrates a view of the ground glass screen 62 having the outline of the fixed reticle symbol 63 and the red reflected images of the character 51a and reticle symbol 52a.

In this embodiment, since each reticle mark of the character negative is individually colored red, no image of the reticle symbol will appear at the exposure station as it will be subtracted from the primary beam and diverted by the dichroic mirror. Likewise, the red component of the character image will be subtracted and diverted leaving only a cyan colored image at the exposure station.

Figure 13:
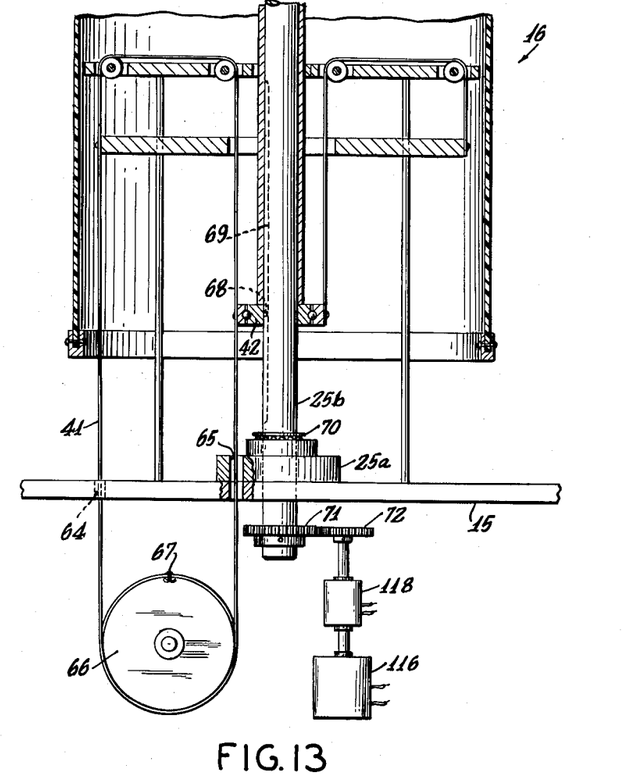
Figure 14:
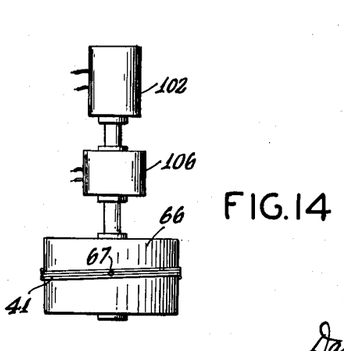

It is possible to provide for automatic electronic centering of the image by modifying the basic structure as hereinafter described in reference to FIGS. 13, 14, 15, 16 and 17 which illustrate the third embodiment of my invention. As shown in FIGS. 13 and 14, vertical movement of the drum 16 may be accomplished by a wire and drum driving mechanism where the wire 41 in one portion of the counterbalance mechanism is extended through holes 64 and 65 in base 15 and wound several turns about the drum 66. The length of wire around the drum 66 is equal to the distance of vertical movement of the character drum 16. The midpoint of the drum cable is secured to the drum 66 by a pin 67 to prevent slippage. To provide horizontal driving movement the shaft 25b is lengthened as illustrated to project below the base 15. The shaft 25b has a longitudinal slot 69 and is fitted with a thrust bearing 70 to journal the shaft in the block 25a. The inner race of the bearing 42 is provided with an inwardly projecting key 68 to engage the slot 69. The lower end of the shaft 25b is fitted with a gear 71 which is meshed with gear 72 of the horizontal servo driving motor 116 through the magnetic clutch 118. Similarly, the hoisting drum 66 is driven from the vertical servo driving motor 102 through magnetic clutch 106, as shown in FIG. 14.

Figure 15:
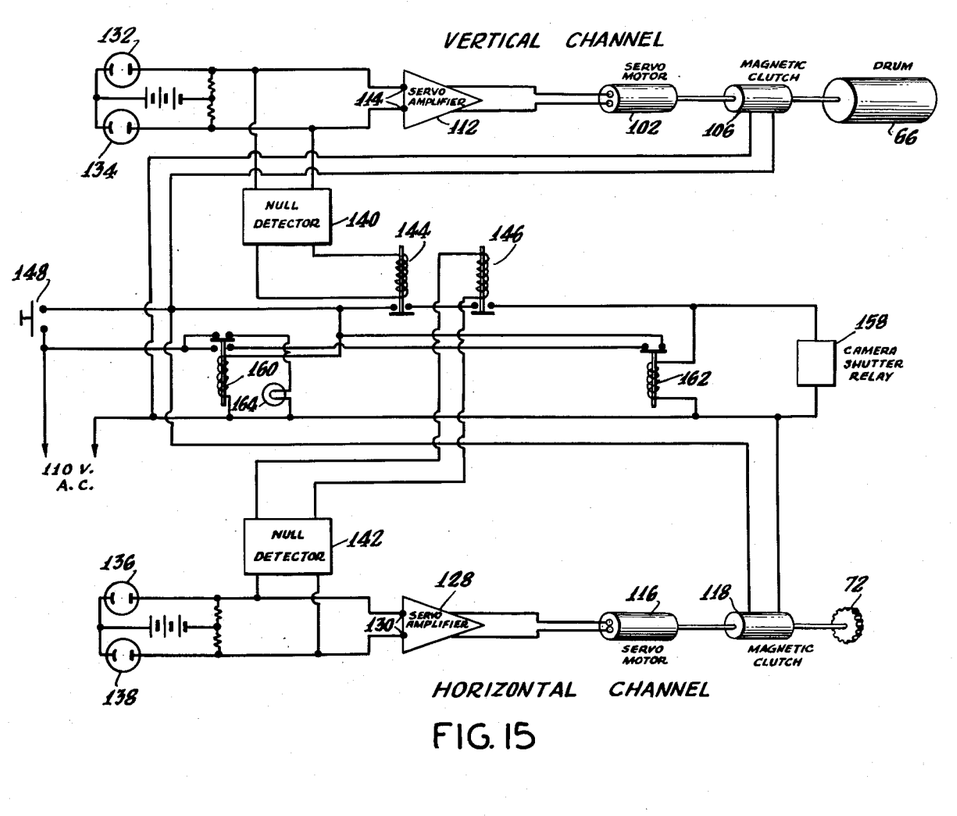

The servo driving motors 102 and 116 are, as shown in the electrical circuit diagram FIG. 15, of the type which operate from servo amplifiers 112 and 128. The input circuits 114 and 130 of the respective servo amplifiers receive a D.C. voltage of either polarity. The polarity of this voltage dictates the direction of rotation and the amount of voltage dictates the speed of each of the driving motors.

The input circuits of both the vertical and horizontal servo amplifier channels are pairs of photocells 132, 134, 136 and 138, respectively. The pairs of cells are connected in a bucking circuit as shown in FIG. 15 so that the difference between their output voltages are fed to the input of their respective servo amplifiers. For example, in the vertical channel if cell 132 was illuminated, a voltage of one polarity would appear at the terminals 114 causing the motor to turn in a given direction. If cell 134 were illuminated, a potential of the opposite polarity would appear at the terminals 114 and the motor would turn in the opposite direction. If the image of the horizontal reticle symbol 80 (FIG. 17) were focused on the surface of the photocells, the image would fall on cell 134 if the drum were too high and, conversely, would fall on the cell 132 if the drum were too low. When the drum is correctly positioned, equal light would fall on both cells and the voltages would cancel at terminals 114 stopping the rotation of the motor 102. Cells 136 and 138 function in the same manner for horizontal adjustment.

To prevent the photograph from being taken when the image is incorrectly positioned null detectors 140 and 142 are employed across the inputs of the servo amplifiers. The electrical contacts of relays 144 and 146 are in series with the current supply to the camera shutter relay 158 to preclude shutter activation until they are energized. In the electronic embodiment the camera is revised to be operated from a relay 158, rather than by a manual switch 21 previously described. The relays 144 and 146 only become energized when the input voltage to the respective servo amplifier is at a null. Thus the drum positioning must be complete before the photograph may be taken.

The magnetic clutches 106 and 118 only operate as the photograph switch 148 is actuated. Thus, the drum positioning only operates after the desired character negative is approximately positioned in the optical path. Depressing the photographic switch 148 causes the drum to align in both directions via the magnetic clutches 106 and 118. When both movements cease the relays 144 and 146 close to actuate the camera electrically.

The pushbutton 148 may be coupled to a holding relay 160 which would shunt the pushbutton until the time delay relay 162 operates opening the circuit to release holding relay 160, returning the system to its original condition. With such an arrangement the operator need merely, manually select the desired character and locate it in approximate position, touch the pushbutton and wait until the camera actuates automatically. An indicator lamp 164 may be connected to additional contacts on the relay 160 to provide a visual signal to the operator to indicate that the selected character has been photographed and that the system is cleared for the selection of the succeeding character. The delay in opening of the contacts of relay 162 is introduced for the purpose of allowing sufficient time for the camera exposure period of say 1/50 second, to elapse before the succeeeding character may be selected for photographing.

Figure 16:
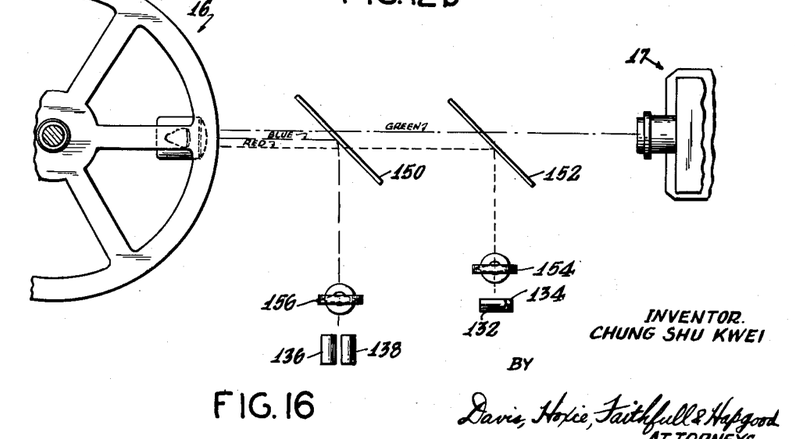
Figure 17:
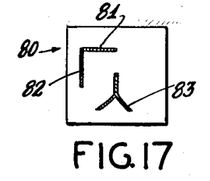

The optical arrangement to accomplish automatic operation of the system will now be described in reference to FIGS. 16 and 17.

In the automatic system the need for the stationary reticle symbol 46 of FIG. 5 is not required. In this arrangement the various elements of a particular character negative are ascribed individual colors as shown in FIG. 17. The character 83 is colored green, the horizontal component of the reticle symbol 81 is red and the vertical component of the reticle symbol 82 is blue. In the optical path as shown in FIG. 16, a first dichroic mirror 150 is situated at a 45° angle in the primary optical path. This dichroic mirror 150 is of the type which will reflect only blue light and transmit all others. A second dichroic mirror 152 is arranged as shown at a 45° angle in the primary optical path and is located between dichroic mirror 150 and the camera 17. Mirror 152 is of the dichroic type which reflects red and transmits all other colors. By this arrangement the blue image of the vertical portion of the reticle symbol 82 may be focused by lens 156 on the two photocells 136 and 138, and no other image will appear at that point. Likewise, the red image of the horizontal portion of the reticle symbol 81, as reflected by the second mirror, is focused by lens 154 on the two photocells 132 and 134. It is to be noted that in the vertical channel the photocells 132 and 134 are positioned one above the other, while the cells 136 and 138 in the horizontal channel are positioned side by side. The camera 17 only views the green image of the desired character, the red and blue components of reticle symbol having been subtracted and diverted by the mirrors 150 and 152. By this color-selective optical arrangement none of the three images will appear at the stations of the other to cause spurious operation of the centering circuitry, nor will any portion of the reticle symbol appear at the photographing station. In selecting the colors to be ascribed to the various parts of the negative image, the color sensitivity of the photocells and film must be considered. For example, some types of film are insensitive to red light and it would be undesirable to assign the color red to the character image for that reason.

I claim:

1. In a photographic recording system having a camera, a film in the camera and a movable member supporting a plurality of images to be photographed, said camera and said member being aligned along the optical axis of the camera where selected of said images are to be selectively maneuvered into position for photographic recording on the film, means for automatically aligning the geometric centers of said selected images on the optical axis after they have been roughly maneuvered into position, said means comprising a reticle symbol associated with each image and geometrically related to the geometric center of said image, said symbol having a horizontal component of one color and a vertical component of a second color, said image having a third color to which said film is selectively sensitive, color image sorting apparatus for subtracting and diverting the colored components of said symbol from the optical path and electro-mechanical apparatus operable by said diverted components to move said roughly aligned member in a direction to cause substantial registration of the image centers on the optical axis, said apparatus including means for arresting movement of said member in response to said registration.

2. In a photographic system including a camera station having an optical axis, a light source, and a movable member interposed between said source and station and having images to be photographed individually by maneuvering said member to introduce selected of said images into said optical axis, means for automatically aligning the geometric center of a selected image with the optical axis, said means comprising a colored reticle symbol on each of the images geometrically related to the geometric center of the image, photoelectric detection means disposed at a point other than on the optical axis, color image deflection and focusing means to subtract the image of the reticle symbol from the optical field of the camera and to divert and focus it onto the photoelectric detection means, said detection means being adapted to develop electrical output signals proportionate to the distance and direction of deviation of the image of said symbol from a desired position representative of the optical axis and electromechanical means adapted to receive said output signals and move said member in such direction and for such distance as to minimize the deviation of the symbol image from said desired position.

3. In a photographic apparatus for composing printed matter and the like, the combination of a drum having at one portion of its periphery a negative provided with arcuate rows of characters to be photographed, the drum having at another portion of its periphery a table of characters corresponding to said first characters and arranged in arcuate rows similar to said first rows, a drum mount on which the drum is rotatable on its axis and movable longitudinally of said axis, a fixed station disposed at one side of the drum periphery, a film exposure station mounted at the opposite side of the drum periphery, said stations lying along a line normally intersecting the surface of said drum, a lens to focus an image of the surface of the drum in the region of the line on said film, the drum being axially and rotatably adjustable on its mount relative to said stations to position a selected negative character for photographing, a stationary index mounted adjacent the drum periphery and coacting with said table to indicate the character thereon corresponding to the negative character positioned for photographing, each of said characters on said negative having associated therewith a reticle mark means geometrically related to the intersection of the horizontal and vertical geometric centerlines of said character, a stationary reticle target means geometrically related to the intersection of the horizontal and vertical geometric optical centerlines of said exposure station, at least one of said reticle means being colored, means including a light source at said fixed station for superimposing the image of said mark means on said target means, and color selective means to prevent recording of the reticle images on the film, the drum being axially and rotatably adjustable on said mount to establish horizontal and vertical coincidence of the reticle mark means and reticle target means for effecting said superimposing.

4. The combination described in claim 3 wherein the color selective means is film selected as being spectrally insensitive to the chosen color.

5. The combination described in claim 3 wherein the color selective means is a dichroic mirror selected to reflect the chosen color and to substantially attenuate direct transmission of said chosen color while transmitting substantially unattenuated all other colors.

6. The combination described in claim 3 wherein the stationary reticle symbol is colored and wherein the color selective means is film selected as being spectrally insensitive to the chosen color.

7. The combination described in claim 3 wherein the character reticle symbol is colored and wherein the color selective means is a dichroic mirror disposed between said movable member and film exposure station to subtract the colored reticle image from the image received at the exposure station.

8. In a photographic apparatus for composing printed matter and the like, the combination of a drum having at one portion of its periphery a negative provided with arcuate rows of characters to be photographed, the drum having at another portion of its periphery a table of characters corresponding to said first characters and arranged in arcuate rows similar to said first rows, a drum mount on which the drum is rotatable on its axis and movable longitudinally of said axis, a light station disposed at one side of the drum periphery, a film exposure station mounted at the opposite side of the drum periphery, said stations lying along a line normally intersecting the surface of said drum, a lens to focus an image of the surface of the drum in the region of the line on said film, the drum being axially and rotatably adjustable on its mount relative to said stations to position a selected negative character for said photographing, a stationary index mounted adjacent the drum periphery and coacting with said table to indicate the character thereon corresponding to the negative character positioned for said photographing, each of said characters on said negative having associated therewith a reticle mark geometrically related to the intersection of the horizontal and vertical geometric centerlines of said character, a fixed reticle mark identical in shape with said character reticle mark disposed in the image area defining the horizontal and vertical geometric optical centerlines of said exposure station, one of said reticle marks being colored, and color selective means to prevent recording of the reticle images on the film, whereby when said reticles are brought into optical registration said character is properly oriented for being photographed.

9. A combination according to claim 8 wherein the color selective means is photosensitive film at the exposure station having a spectral characteristic insensitive to at least one color of visible light, the fixed reticle mark being of said color to which the film is insensitive.

10. In a photographic apparatus for composing printed matter and the like, the combination of a drum having at one portion of its periphery a negative provided with arcuate rows of characters to be photographed, the drum having at another portion of its periphery a table of characters corresponding to said first characters and arranged in arcuate rows similar to said first rows, a drum mount on which the drum is rotatable on its axis and movable longitudinally of said axis, a light source disposed at one side of the drum periphery, a film exposure device mounted at the opposite side of the drum periphery in position to receive an image of one of said negative characters projected by the light source, the drum being axially and rotatably adjustable on its mount relative to said source and exposure device to position a selected negative character for said projection, a stationary index mounted adjacent the drum periphery and coacting with said table to indicate the character thereon corresponding to the negative character positioned for said projection, each of said negative characters having associated therewith a colored reticle symbol geometrically related to the geometric center of the particular character, a fixed reticle symbol geometrically related to the center of said exposure device onto which an image of said character reticle symbol may be superimposed, and a dichroic mirror disposed between the drum and exposure device to divert the colored reticle image onto the fixed reticle symbol whereby registration of the geometric center of the negative character and the geometric center of said exposure device may be effected visually.

11. In a photographic system having a fixed focus camera having a focus field disposed along its optical axis and a movable member provided with a plurality of negative images each having a geometric center and which are to be selectively moved into the focus field for photographing by the camera, means for use in positioning the geometric centers of said images on the optical axis comprising a negative reticle symbol in each image area related to the geometric center of its associated image, and a fixed positive reticle symbol identical in shape to said negative reticle symbol positioned between said movable member and said camera immediately adjacent said movable member, one of said reticle symbols being colored, and color selective means to prevent the recording of reticle images by the camera when said reticles are aligned.

12. The system in claim 11 wherein the color selective means comprises photosensitive film located in said camera insensitive to the particular color of visible light of said colored reticle symbol.

13. In a photographic system having a fixed focus camera having a focus field disposed at a point on its optical axis and a movable member disposed at that point provided with a plurality of negative images each having a geometric center which are to be selectively maneuvered by an operator into the focus field for photographing at the camera, means for use in positioning the geometric centers of said images on the optical axis of the camera comprising a reticle symbol associated with each negative image area and geometrically related to the geometric center of its associated image, a second fixed reticle symbol identical in shape to said first reticle symbols disposed to permanently indicate the geometric center of the camera, one of said reticle symbols being colored, means to superimpose the image of a first reticle symbol onto the fixed reticle symbol, color selective means to prevent recording of reticle images by the camera and means to visually present an image of said superimposed reticle symbols to the operator at an operating station remote from said optical axis.

14. In a photographic system having a fixed focus camera having a focus field disposed on its optical axis and a movable member disposed at that point, said member being provided with a plurality of negative images each having a geometric center and which are to be selectively maneuvered by an operator into the focus field for sequential photographing at the camera, the improvement comprising a reticle symbol associated with each negative image area and geometrically related to the geometric center of its associated image, said symbol having a horizontal component of one color and a vertical component of a second color and said negative image having a third color, a photosensitive film located in the camera and sensitive to said third color, two dichroic mirrors each adjusted to reflect alternate of the colors of the reticle symbol disposed angularly along the optical axis to subtract and divert the colored components of the symbol from the optical axis, a pair of lenses, two pairs of photoelectric cells, said lenses each projecting an image of one of the diverted symbol components onto a pair of said photoelectric cells, an electronic control circuit and a pair of servo-driving motors, said motors being connected to said movable member and operable, respectively, to impart vertical and horizontal motion to said negative images, said electronic control circuit interconnecting the pairs of photoelectric cells and the respective driving motors and being operable to cause said motors to move said images in a direction to make each of the images of said diverted symbol components fall equally upon its associated pair of photoelectric cells, said circuit including means for stopping the respective drive motors in response to said images so falling.

References Cited in the file of this patent

UNITED STATES PATENTS

| | | |
|---|---|---|
| 2,160,750 | Meyer | May 30, 1939 |
| 2,563,892 | Waller | Aug. 14, 1951 |
| 2,709,952 | Brock | June 7, 1955 |
| 2,820,404 | Kwei | Jan. 21, 1958 |

FOREIGN PATENTS

| | | |
|---|---|---|
| 912,417 | Germany | May 28, 1954 |

FIG. 1.

Inventors
KARL KRÖMER
EDITH BERGER
By Irwin S. Thompson
Attorney